United States Patent [19]

Nurnberg

[11] 4,116,219
[45] Sep. 26, 1978

[54] DIFFERENTIAL THERMOSTATIC CONTROLLER FOR SOLAR HEATING SYSTEM

[75] Inventor: Richard K. Nurnberg, Norristown, Pa.

[73] Assignee: Robertshaw Controls Company, Richmond, Va.

[21] Appl. No.: 679,286

[22] Filed: Apr. 22, 1976

[51] Int. Cl.² .............................................. F24J 3/02
[52] U.S. Cl. ................... 126/271; 236/91 F; 237/1 A; 126/270; 126/400
[58] Field of Search ................... 126/270, 271, 400; 237/1 A; 165/18, 47; 236/91 F, 78 B

[56] References Cited

U.S. PATENT DOCUMENTS

| 3,388,860 | 6/1968 | Kruper | 236/78 B X |
| 3,747,849 | 7/1973 | Heierli | 236/91 F |
| 3,931,806 | 1/1976 | Hayes | 126/271 |
| 3,986,489 | 10/1976 | Schlesinger | 126/270 |
| 3,998,207 | 12/1976 | Watt | 126/400 X |

*Primary Examiner*—William F. O'Dea
*Assistant Examiner*—Larry Jones
*Attorney, Agent, or Firm*—Harold W. Adams; Auzville Jackson, Jr.

[57] ABSTRACT

A controller for a solar heating system includes a differential thermostat which responds to a preselected temperature differential between fluid in a solar collector and in a storage tank to operate a motor to pump fluid therebetween. The particular circuitry of the thermostat allows the use of non-linear sensing devices. Safety features includable in the controller provide for sensing of high and low extreme temperature conditions to prevent excess pressure in the storage tank or freezing of water in the collector.

11 Claims, 5 Drawing Figures

DIFFERENTIAL THERMOSTATIC CONTROLLER FOR SOLAR HEATING SYSTEM

BACKGROUND OF THE INVENTION

1. Field of the Invention

The present invention relates to thermostats and to controllers for heating systems, particularly for solar heating systems, in which a fluid circulation device is to be operated in response to the sensed differential temperature between fluids at two different localities.

2. Description of the Prior Art

The prior art is generally cognizant of nonelectronic controllers for solar heating systems, some of which are responsive to differential temperatures. U.S. Pat. No. 2,396,338 describes a radiation heating and cooling system which includes a differential temperature responsive device, constructed using fluid charged bulbs and bellows constructions, to sense temperature. U.S. Pat. No. 3,598,104 disloses a heating system for swimming pools using a surface temperature sensor, a subsurface temperature sensor and a comparator for comparing the voltage produced therebetween with a standard to operate a water circulation pump. U.S. Pat. Nos. 3,295,353 and 3,768,059 show other differential temperature responsive devices. U.S. Pat. Nos. 3,725,644 and 3,857,285 show other electronic temperature responsive devices.

SUMMARY OF THE INVENTION

The present invention is summarized in that a solar heating system is provided with a controller for energizing a pump motor to circulate fluid between a solar collector and a storage tank, the controller including first temperature responsive means for sensing the temperature in the collector, second temperature responsive means for sensing the temperature in the storage tank, switching means for energizing the pump motor, first comparator means responsive to the difference between the temperatures sensed by the first and second temperature responsive means for allowing operating the switching means to energize the motor, and second comparator means for responding to the total temperature sensed by both the first and second temperature responsive means to inhibit the switching means to prevent energization of the motor.

An object of the present invention is to construct a controller for a solar heating system that measures the temperature differential sensed by sensors in a solar collector and a storage tank to operate a circulation pump, and that also uses the same sensors to sense a safety limit temperature condition.

It is another object of the present invention to construct such a controller that accomplishes these functions and can utilize non-linear temperature responsive resistance sensors.

It is yet another object of the present invention to construct such a controller with a provision to operate the pump when the temperature sensed at the collector is below a minimum to prevent freezing.

It is still another object of the present invention to construct such a controller in which the set-points of operation of the controller are adjustable.

Still other objects, advantages and features of the invention will become apparent from the foregoing description when taken in conjunction with the accompanying drawings.

DESCRIPTION OF THE PREFERRED EMBODIMENT

Figure 1:
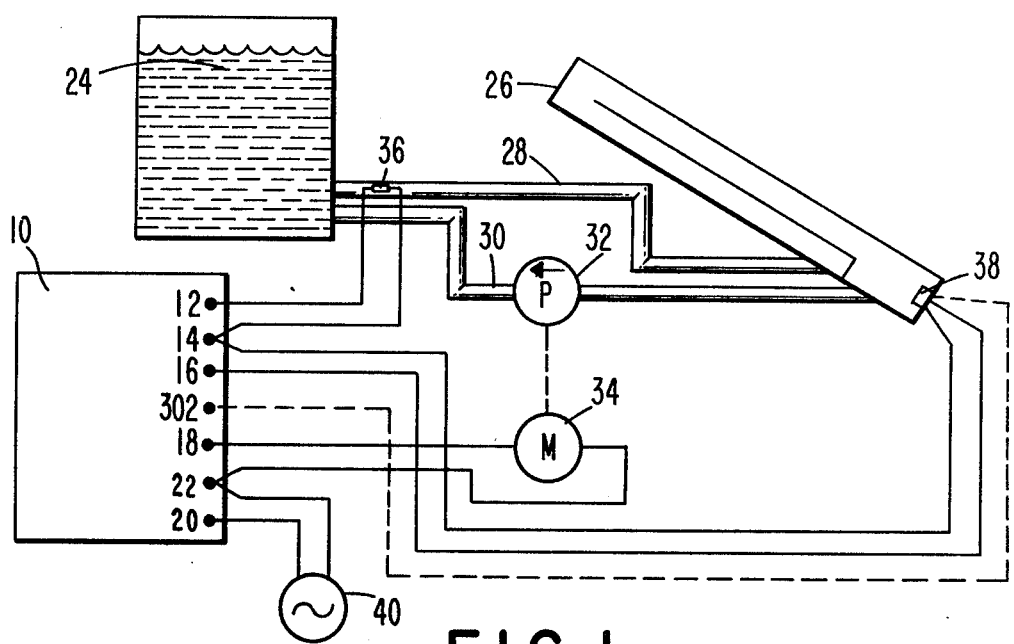
FIG. 1 is a schematic diagram of a solar heating system constructed according to the present invention.

As shown in FIG. 1, the present invention is embodied in a solar heating system including a differential thermostatic controller. The controller is largely housed in an electrical housing 10 upon the exterior of which are mounted electrical terminals 12, 14, 16, 18, 20 and 22. The solar heating system includes a hot water storage tank 24, a solar water-heating collector panel 26, and a pair of circulation pipes 28 and 30 joining the storage tank 24 to the solar collector 26. A circulation pump 32 is inserted in the water circulation pipe 30. An electric motor 34 is connected so as to drive the pump 32, the motor 34 being connected between the terminals 18 and 20 on the housing 10. A temperature responsive resistance 36 is mounted on and extends into the water circulation pipe 28 adjacent the storage tank 24. The temperature responsive resistance 36 is connected to the terminals 12 and 14 on the housing 10. A temperature responsive resistance 38 is mounted extending into the solar collection panel 26. The temperature responsive resistance 38 is connected to the terminals 14 and 16 on the housing 10. A source of alternating-current electromagnetic energy, is connected to the terminals 20 and 22 on the housing 10.

Figure 2:
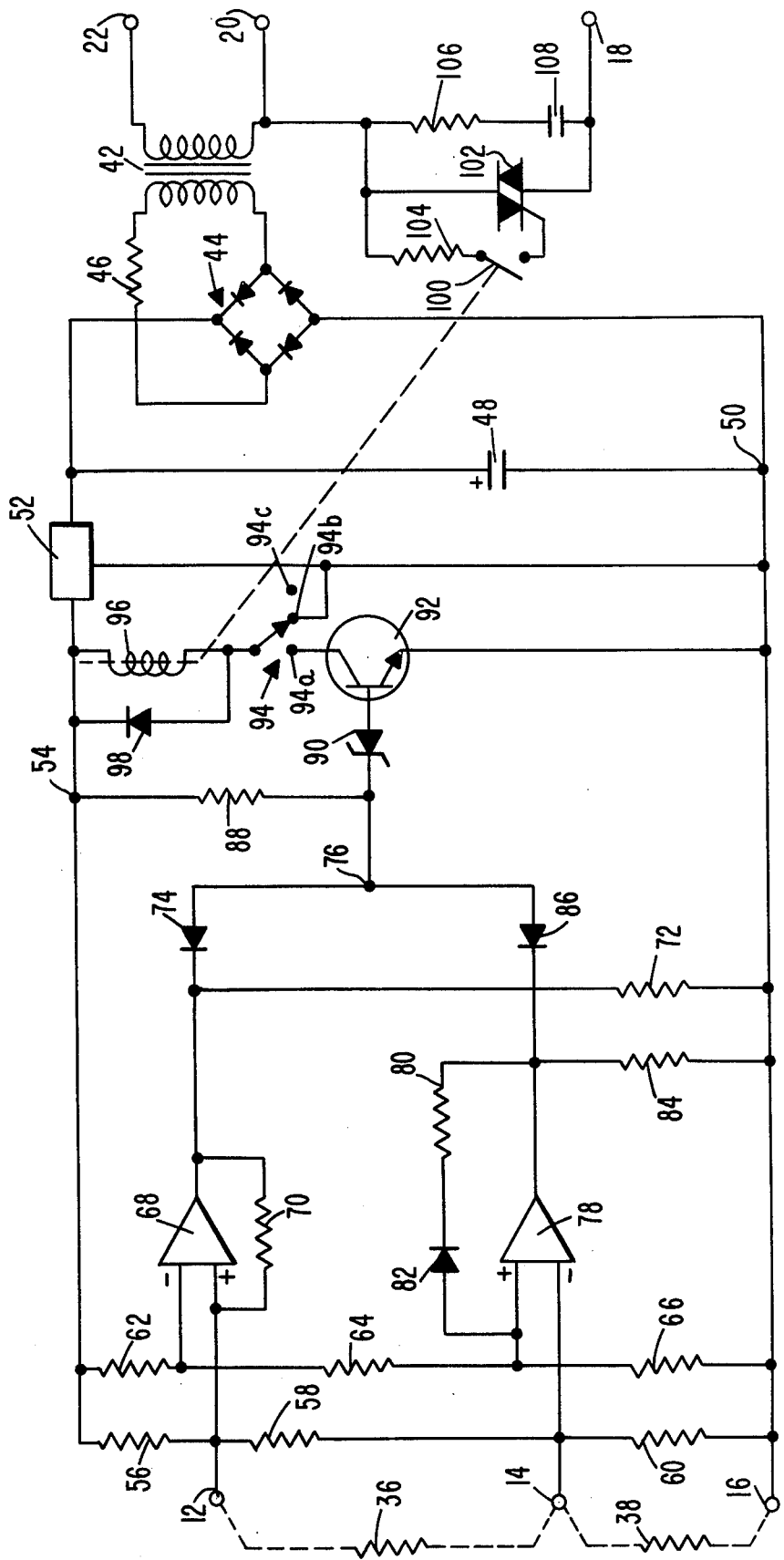
FIG. 2 is a circuit diagram of the portion of FIG. 1 within the housing.

Shown in FIG. 2 are the details of the circuitry of the controller contained in the housing 10. The terminals 20 and 22 are connected to opposite ends of the primary winding of a voltage step-down transformer 42. Connected to the secondary winding of the voltage step-down transformer 42 is a full-wave rectifier generally indicated at 44 which includes four diodes biased so as to cause full-wave rectification of the output of the secondary of the voltage stepdown transformer 42. Connected between one end of the secondary of the voltage step-down transformer 42 and the full-wave rectifier 44 is a voltage limiting resistor 46. Connected to the full-wave rectifier 44 so as to receive the fully rectified waveform therefrom is a filter capacitor 48. The junction of one plate of the filter capacitor 48 and the anodes of a pair of diodes in the full wave rectifier 44 forms a circuit ground 50. The other plate of the filter capacitor 48, which is connected to the cathodes of the other pair of diodes in the full-wave rectifier 44, is connected to one terminal of a voltage regulator 52. A second terminal of the voltage regulator 52 is joined directly to the ground 50. A third terminal of the voltage regulator 52 is connected to a DC voltage node 54.

Connected between the voltage node 54 and the ground 50 is a series circuit of a reference resistor 56, a protective resistor 58 and a protective resistor 60. The junction of the reference resistor 56 and the protective resistor 58 is joined directly to the terminal 12. Similarly, the junction of the protective resistor 58 and the protective resistor 60 is joined directly to the terminal 14 and the ground 50 is joined directly to the terminal 16. Also wired between the voltage node 54 and the ground 50 is a serially connected circuit of three voltage dividing resistors 62, 64 and 66. An operational amplifier 68 has its inverting input connected to the junction of the voltage dividing resistors 62 and 64. The non-inverting input of the operational amplifier 68 is joined to the junction of the reference resistor 56 and the protective resistor 58 which is also joined to the terminal 12. A feedback resistor 70 joins the output of the operational amplifier 68 to its noninverting input. A resistor 72 joins the output of the operational amplifier 68 to the ground 50. The output of the operational amplifier 68 is also connected to the cathode of a diode 74, the anode of which is connected to a circuit junction 76. A second operational amplifier 78 has its inverting input connected to the junction of the protective resistor 58 and the protective resistor 60, which junction is also joined directly to the terminal 14. The non-inverting input to the operational amplifier 78 is connected to the junction of the voltage dividing resistors 64 and 66. The output of the operational amplifier 78 is connected through a feedback resistor 80 to the cathode of a diode 82, the anode of which is connected to the non-inverting input of the operational amplifier 78. A resistor 84 connects the output of the operational amplifier 78 to the ground 50. A diode 86 has its cathode wired to the output of the operational amplifier 78 and its anode wired to the circuit junction 76. A resistor 88 connects the circuit junction 76 with the voltage node 54. A zener diode 90 is wired with its cathode connected to the voltage node 76 and its anode tied to the base of a switching transistor 92. The emitter of the transistor 92 is joined directly to the ground 50. The collector of the transistor 92 is wired to terminal 94a of a singlepole function switch 94. A terminal 94b of the switch 94 is connected directly to the ground 50. A terminal 94c of the switch 94 is unconnected to the rest of the circuit. The switch arm of the switch 94 is wired to one side of a relay coil 96, the other side of the relay coil 96 being connected to the voltage node 54. A protective diode 98 is attached in parallel across the relay coil 96 with its cathode connected to the voltage node 54 in order to prevent damage to the relay coil 96 due to transient voltages. The relay coil 96 operates a pair of relay contacts 100. One side of the relay contacts 100 is joined to the gate terminal of a triac 102. The other side of the relay contacts 100 is wired through a resistor 104 to one of the main terminals of the triac 102. The main terminal of the triac 102 which is connected to the resistor 104 is also joined directly to the terminal 20. The other main terminal of the triac 102 is connected to the terminal 18. Wired in parallel across the main terminals of the triac 102 is series circuit of a resistor 106 and a capacitor 108 whose values are chosen so as to limit the rise time of the voltage across the main terminals of the triac 102 in order to suppress transients to prevent false triggering.

In the operation of the solar heating system of FIGS. 1 and 2, heat is absorbed from incident solar radiation by the water in the solar collector 26. Heated water for eventual use is stored in the storage tank 24. Water is circulated between the solar collector 26 and the storage tank 24 by the pump 32. The temperature responsive resistors 36 and 38 sense the temperature at the outlet of the storage tank 24 and in the solar collector 26 respectively. Since the goal of the system is to heat the water in the storage tank 24 to a maximum, it becomes desirous that the pump 32 only be driven when the temperature of the water in the collector 26 is somewhat higher than the temperature of the water of the storage tank 24. Thus, the circuitry of the controller inside the housing 10 functions to operate the motor 34 and thereby the pump 32 only when the difference between the temperatures sensed by the temperature responsive resistance 36 and 38 has reached a pre-selected value. When the temperature sensed by the temperature responsive resistance 38 is greater than the temperature sensed by the temperature responsive resistance 36 by the pre-selected value, the motor 34 will be operated to circulate the water from the storage tank 24 through the solar collector 26. When the temperature sensed by the temperature responsive resistance 38 does not exceed the temperature sensed by the temperature responsive resistance 36 by this pre-selected value, no water circulation will result and the heat content of the water in the storage tank 24 will be conserved.

In the specific operation of the circuitry of FIG. 2, AC power is received through the terminals 20 and 22 which are connected to the AC power source 40. The AC output of the voltage stepdown transformer 42 is fully rectified by the full-wave rectifier 44 and is filtered by the filter capacitor 48 to supply a rectified and filtered DC voltage to the input of the voltage regulator 52. The resistor 46 functions to limit the surge current flow through the diodes in the rectifier 44. The voltage regulator 52 functions to create a regulated DC voltage at its output, the voltage node 54.

All current to the motor 34 must flow through the terminal 18. The current through terminal 18 is controlled by the state of conduction of the triac 102. The conduction of the triac 102 is controlled by the voltage signal imposed at its gate terminal by the relay contacts 100. The relay contacts 100 are operated by the relay coil 96 which is connected in a series circuit with the switch 94. If the switch arm of the switch 94 is in position to contact the contact 94c, no current can flow through the relay coil 96 and the relay contacts 100 will be open to turn off the triac 102. If the switch arm of the switch 94 is in position to touch the contact 94b of the switch, the relay coil 96 will be energized thereby operating the relay closing the contacts 100 turning on the triac 102 and energizing the motor 34. If the switch arm of the switch 94 is in position to contact the contact 94a, as it will be normally, the operation of the relay coil 96 will be controlled by the state of conductivity of the transistor 92. The state of conductivity of the transistor 92 is determined by the state of the output of the operational amplifiers 68 and 78 as will be more fully explained hereinafter. Thus the switch 94 switches the circuitry of FIG. 2 from a manual off-mode when the switch arm is at the contact 94c, to manual on-mode when the switch arm is at the contact 94b, to an automatic mode when the switch arm contacts the contact 94a.

The voltage dividing resistors 62, 64 and 66 function to create fixed DC voltage at the inverting input of the operational amplifier 68 and at the non-inverting input of the operational amplifier 78. These fixed voltages will be compared by the operational amplifiers 68 and 78 to temperature dependent voltages created at the other inputs to the operational amplifiers by the temperature responsive resistances 36 and 38 to determine output states of the operational amplifiers. The voltage at the terminal 14, which is the temperature dependent voltage sensed at the inverting input of the operational amplifier 78, is created by the resistance differential between the temperature responsive resistances 36 and 38. The temperature responsive resistances 36 and 38, which are preferably negative temperature coefficient devices, will decline in resistance as the temperature sensed by each of the temperature responsive resistances increases. The values of the voltage dividing resistors 62, 64 and 66 are chosen so that when the resistance values of the temperature responsive resistances are approximately equal, the voltage at the inverting input of the operational amplifier 78 will be less than that at the noninverting input, to cause the output of the operational amplifier 78 to be driven low. When, however, the resistance of the temperature responsive resistance 38 decreases, due to an increase in the water temperature in the solar collector 26, the voltage at the inverting input of the operational amplifier 78 will drop. When this voltage becomes lower than that at the noninverting input, the output of the operational amplifier 78 will be driven high. The output of the operational amplifier 78 will therefore be low when the differences in the temperatures sensed by the temperature responsive resistances 36 and 38 are zero or small, and high when that temperature sensed by the temperature responsive resistance 36 is less than that sensed by the temperature responsive resistance 38 by a pre-selectable difference. This difference is selected by the values chosen for the voltage dividing resistors 64 and 66, the voltage dividing resistor 62 and the reference resistor 56 being relatively small resistances and neglectable at this point. The protective resistor 60 functions to prevent an open circuit anywhere between either of the terminals 14 and 16 and temperature responsive resistance 38. The value selected for the protective resistor 60, and for the similar protective resistor 58, will be several times larger than the resistance normally associated with the temperature responsive resistance 38 and 36, in their normal operating range. The resistor 80 and diode 82 serve as a hysteresis loop to provide a selectable temperature difference between the turn-off and turn-on temperature of the output of the operational amplifier 78. When the output of the operational amplifier 78 is high, the diode 82 is reversed-biased and the resistor 80 can be ignored since no current flows therethrough. When, however, the output of the operational amplifier goes low, the diode 82 is forward-biased, in effect inserting the resistors 80 and 84 in parallel with the voltage dividing resistor 66. This lowers the voltage at the non-inverting input of the operational amplifier 78 when its output is low so that the voltage required at the inverting input to turn the output of the operational amplifier 78 from low to high will be lower than that voltage necessary to turn that output from high to low. Thus once a sufficient temperature is sensed to operate the pump 32, the pump 32 will be operated until the temperature difference between the solar collector 26 and the storage tank 24 is low. The difference between the turn-on and turn-off temperatures is determined by the value of the resistor 80.

The circuit junction 76 rests normally at a high fixed voltage determined by the voltage drop created by the reverse-bias breakdown voltage of the zener diode 90. When the output of the operational amplifier 78 is high, the diode 86 is reversed-biased. When the diode 86, or the similar diode 74, is reversed biased, current flows through the resistor 88 and through the reverse-biased zener diode 90 to supply base drive current to the switching transistor 92, driving the switching transistor 92 into conduction. With the switch arm of the switch 94 in its automatic mode at the contact 94a, the conduction of the switching transistor 92 energizes the relay coil 96 and therethrough the motor 34. When the output of the operational amplifier 78 goes low, however, the diode 86 is forward-biased, lowering the voltage at the circuit junction 76 to draw the current from the resistor 88 through the diode 86 and the resistor 84. Thus the zener diode 90, which is then below its reverse-bias-breakdown voltage, will allow no current flow to the base of the switching transistor 92, de-energizing the relay coil 96 and therethrough the motor 34. Similarly, a low at the output of the operational amplifier 68 will forward bias the diode 74 to turn off the motor 34 in the same manner as the operational amplifier 78. Thus the diode 74 and 86 and the operational amplifier 68 and 78 form an OR-circuit at the circuit junction 76 so that if either of the operational amplifier 68 or 78 has its output driven low the motor 34 will be off, and so that both the operational amplifiers 68 and 78 must have their outputs high for the motor 34 to be on.

The output of the operational amplifier 68 will normally rest at a high voltage inasmuch as the voltage at its non-inverting input is normally higher than that at its inverting input. The voltage at the inverting input to the operational amplifier 68 is a fixed voltage created by the voltage dividing resistor 62, and the combined resistances of the voltage dividing resistors 64 and 66. The voltage at the non-inverting input to the operational amplifier 68 is determined by the relative resistances of the reference resistor 56 and the combined resistance of the serially-connected temperature responsive resistances 36 and 38. The voltage at the non-inverting input of the operational amplifier 68 will therefore be below that at the inverting input only when the combined resistances of the temperature responsive resistances 36 and 38 are both relatively low. The water in the solar collector 26 and the storage tank 24 will always be relatively close in temperature, providing the switch 94 is in the automatic position, so the resistance of the temperature responsive resistances 36 and 38 will be close to each other. Therefore a drop in the combined resistances of the temperature sensitive resistances 36 and 38 indicates that the temperature of the water in the solar collector 26 and the storage tank 24 is high. When that water temperature reaches a certain preselected level, i.e. when the resistance of the serially connected temperature responsive resistances 36 and 38 drops to a value such that the voltage at the non-inverting input to the operational amplifier 68 is less than the voltage at the inverting input, the output of the operational amplifier 68 will be driven low to turn off the motor 34 to present the temperature of the water in the storage tank 24 from rising any higher. This prevents excessive pressure build up in the storage tank 24. The value of this high temperature cut-off is determined by the values of the reference resistor 56 and of the voltage dividing resistors 62, 64, and 66.

Thus the system of FIGS. 1 and 2 will, when in the automatic mode as selected by the switch 94, as it normally will be, operate the motor 34 and the pump 32 when either of two conditions is not met. If the temperature of the water in the storage tank 24, as sensed by the temperature responsive resistance 36, approaches the temperature of the water in the solar collector 26, as sensed by the temperature responsive resistance 38, the operational amplifier 78 will switch its output to cause the motor 34 to be deenergized. This is done inasmuch as there is no need to circulate water when the temperature differential is small between the solar collector 26 and the storage tank 24 since such circulation would then not serve to heat the water in the storage tank 24, which is the goal of the system. Secondly, if the temperatures sensed by the combined temperature responsive resistances 36 and 38 exceeds a preselectable limit, the operational amplifier 68 will switch its output to turn the motor 34 off. This is done to prevent the temperature of the water in the storage tank 24 from exceeding a safe level. Thus the system provides both optimum efficiency in the circulation of the water to achieve an optimum temperature of the water in the storage tank 24, and a safety limit to prevent the temperature in that storage tank from exceeding a level, and accomplishes both functions using the same two sensing devices.

Figure 3:
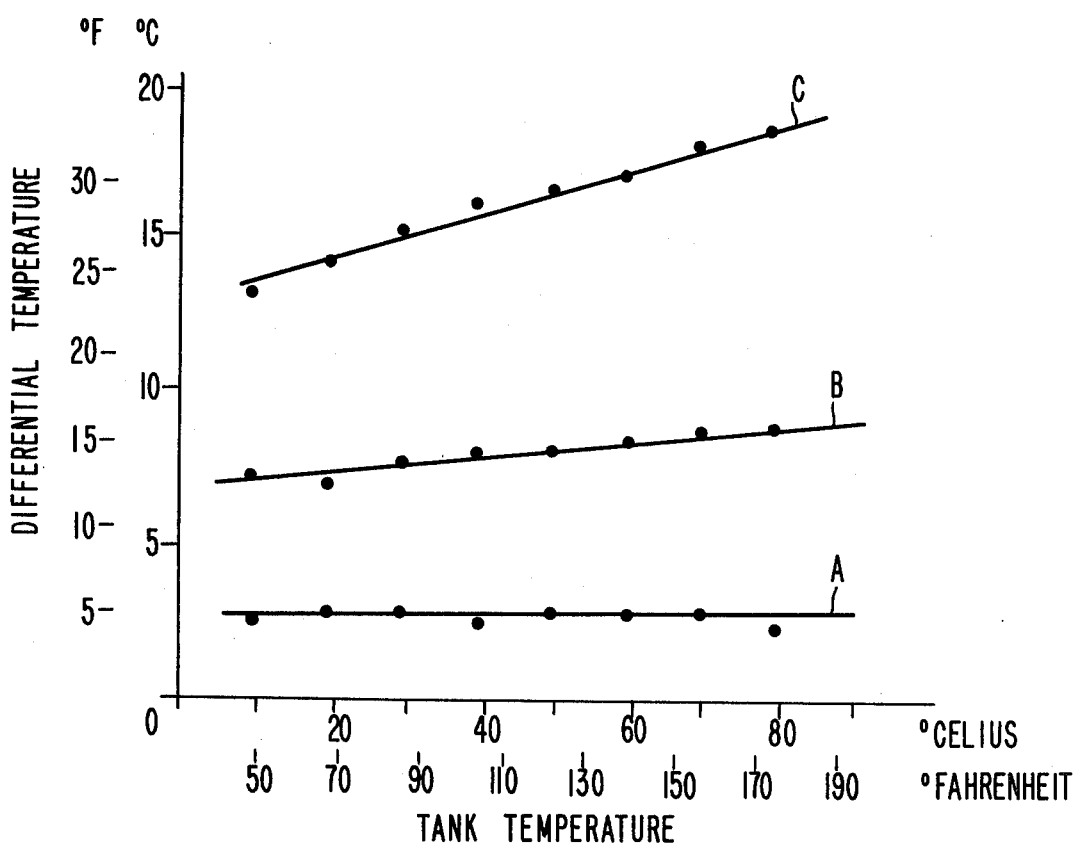
FIG. 3 is a graph of the differential set-point temperature variations plotted against tank temperature for the system of FIG. 1.

The particular arrangement of the devices in the circuitry of FIG. 2 provides an advantage of the present system in that it is possible in this system to use non-linear thermistors for the temperature responsive resistances 36 and 38, providing that the two non-linear thermistors used are either of a similar type or have similar non-linear temperature responsive curves. It has been found, using a Yellow Springs Instrument Co. Thermistor No. 44008 for each of the temperatures responsive resistances 36 and 38, that, in spite of the pronounced non-linearity of this device, the turn-on and turn-off temperatures of the system vary only slightly over the operating temperature range of the system. This is illustrated graphically in FIG. 3, which shows the actual experimental differential temperature turn-on or turn-off temperatures plotted against the water temperature in the storage tank 24. Line A represents a 5° F. nominal turn-off set-point, i.e., the values of the resistors 64 and 66 being selected so that the output of the operational amplifier 78 switches low when the temperature of the water in the solar collector 26 is five degrees or less greater than the temperature of the water in the storage tank 24. For this setting, the differential sensed temperature varies little at all over the entire operating temperature range of the system. Line B represents a nominal set-point of 15° F., either for turn-off or for turn-on. The actual sensed differential temperature which activates the system varies only about 2° F. from 50° to 190° F., an insignificant change. Even with a nominal differential set-point of 30° F., normally used only for the turn-on setting as determined by the values of the resistors 64, 66 and 80, the Line C shows that the actual measured turn-on temperature varies only about 7° F. over the operating range of the system. Thus good set-point stability for turn-on and turn-off temperatures is achieved by the system without the need for linear sensors.

Figure 4:
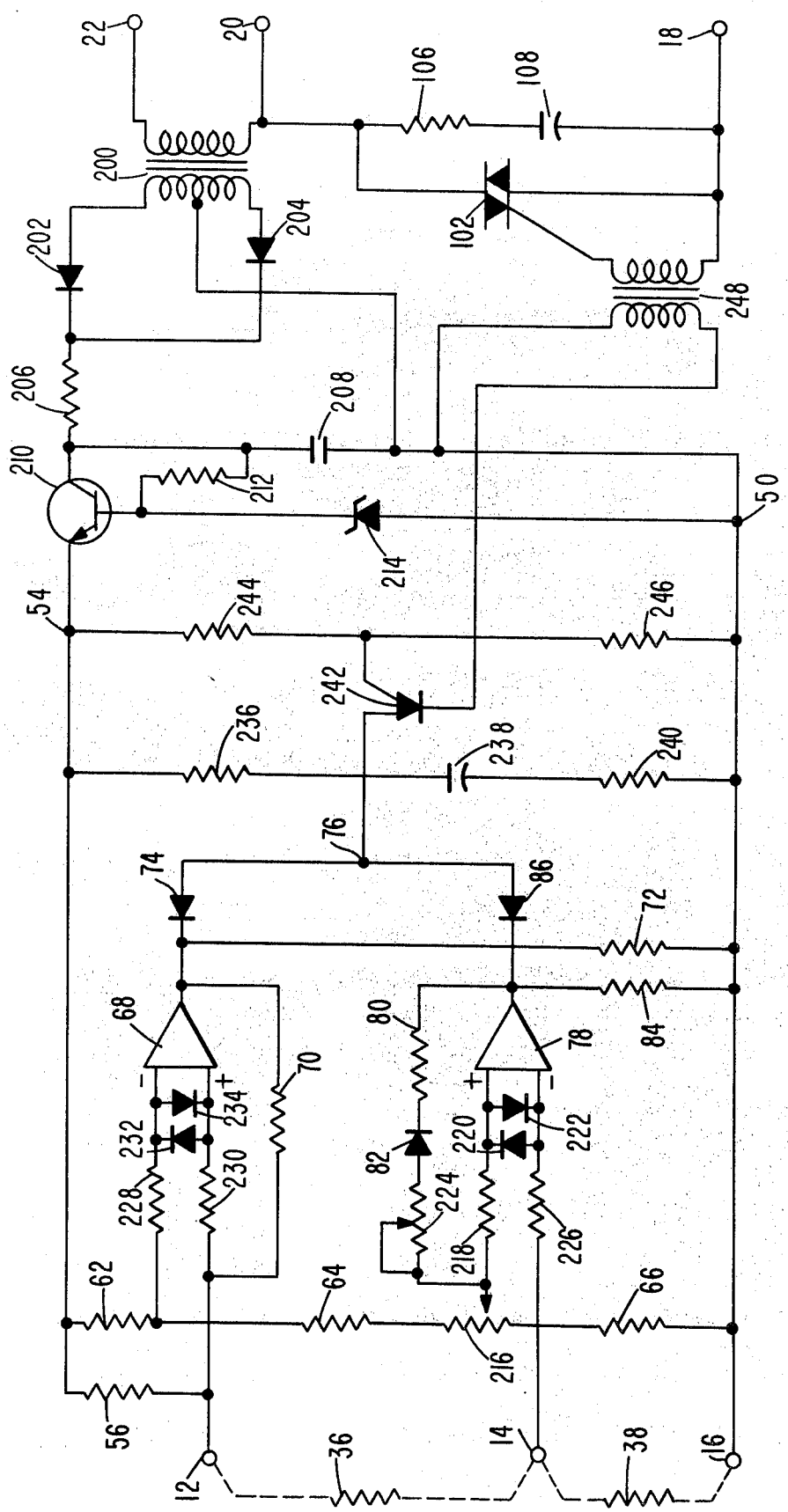
FIG. 4 is a circuit diagram for an alternative embodiment for the circuitry within the housing of FIG. 1.
Figure 5:
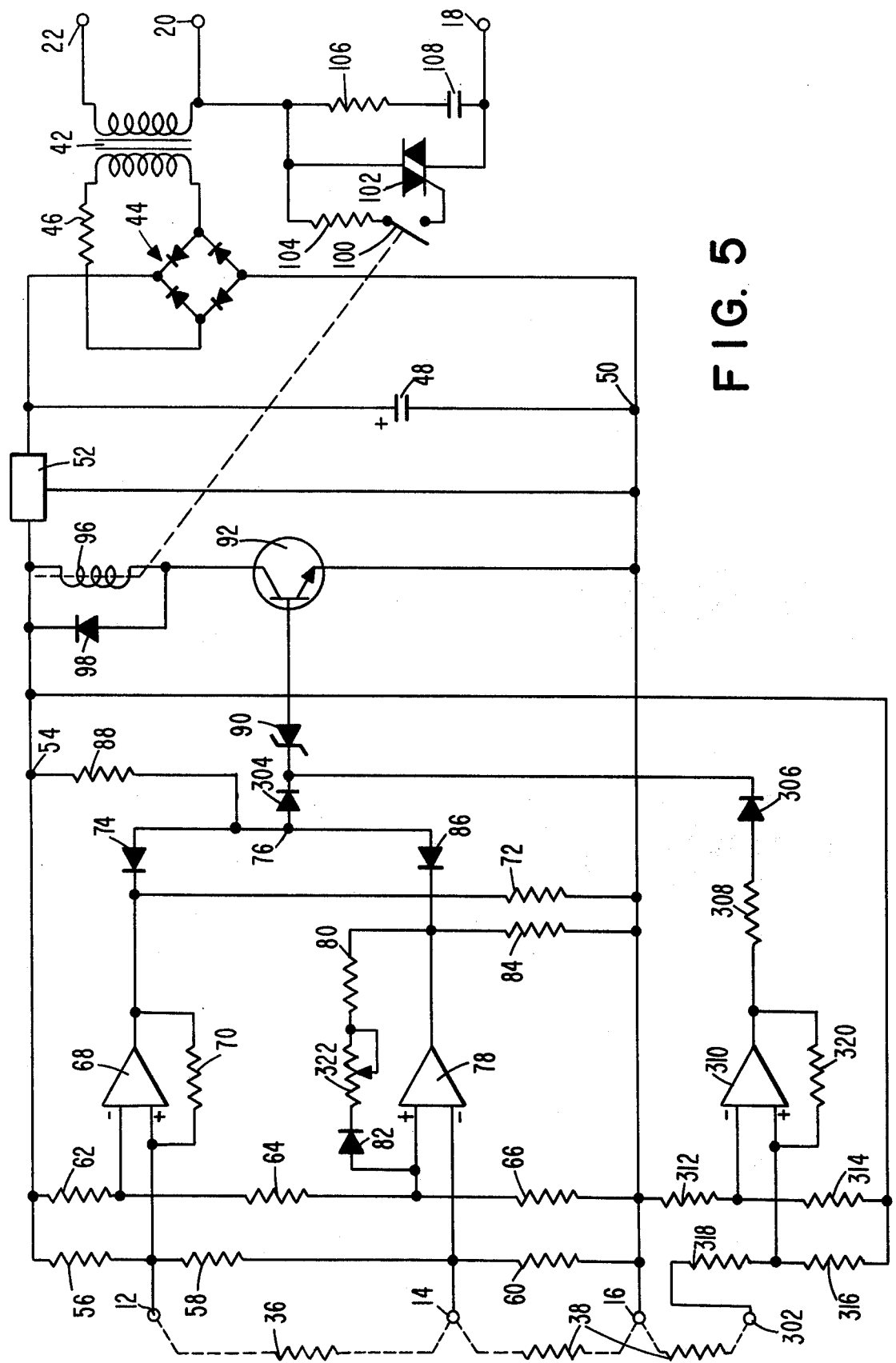
FIG. 5 is a circuit diagram of yet another alternative embodiment for the circuitry within the housing of FIG. 1.

Alternative embodiments of the circuitry of FIG. 2 usable in the present invention are shown in FIG. 4 and 5. Circuit components whcih are identical to those in the circuitry of FIG. 2 have been given the same reference numerals and will not be described in detail again. New or altered components will be given new reference numerals and described as follows.

In the circuitry of FIg. 4, which is enclosed in the housing 10 of FIG. 1, a voltage stepdown transformer 200 has its primary connected between the terminals 20 and 22. The secondary of the transformer 200 is center tapped to connect to the ground 50, and its opposite ends are connected to the anodes of diodes 202 and 204 which have their cathodes connected to one end of a resistor 206. The resistor 206 serves to limit surge current to a filter capacitor 208 which is connected between the other end of the resistor 206 and the ground 50. The other end of the resistor 206 is also connected to the collector of a pass transistor 210, the base of which is joined to its collector by a resistor 212. Also connected to the base of the transistor 210 is the cathode of a zener diode 214 the anode of which is connected to the ground 50. The emitter of the transistor 210 is connected to the DC voltage node 54.

Connected between the voltage dividing resistors 64 and 66 are the opposite ends of a set-point potentiometer 216. The wiper of the potentiometer 216 is wired through a resistor 218 to the non-inverting input of the operational amplifier 78. A pair of voltage limiting diodes 220 and 222 are connected in opposite directions between the inverting and non-inverting inputs to the operational amplifier 78. Also wired to the wiper of the potentiometer 216 are one end and the wiper of a feedback potentiometer 224. The other end of the potentiometer 224 is joined to the anode of the diode 82. A resistor 226 connects the inverting input of the operational amplifier 78 with the terminal 14. A pair of resistors 228 and 230 connect the inverting and non-inverting inputs of the operational amplifier 68 to the junction of the voltage dividing resistors 62 and 64 and to the terminal 12 respectively. A pair of voltage limiting diodes 232 and 234 are wired in opposite polarities between the two inputs to the operational amplifier 68.

Wired between the voltage node 54 and the ground 50 is the series circuit of a timing resistor 236, a timing capacitor 238, and a resistor 240. The junction of the timing resistor 236 and the timing capacitor 238 is connected to the anode of a programmable unijunction transistor (PUT) 242. A pair of voltage dividing resistors 244 and 246 are also wired between the voltage node 54 and the ground 50 with the junction of the resistors 244 and 246 being joined to the gate of the PUT 242. The cathode of the PUT 242 is connected to one side of the primary of an isolation transformer 248, with the other side of the primary being connected to the ground 50. The secondary of the transformer 248 is connected at its opposite ends to the gate terminal of the triac 102 and to the terminal 18.

In the operation of the circuitry of FIG. 4 in the system of FIG. 1, the AC voltage is received through the terminals 20 and 22 and is reduced in voltage by transformer 200. The diodes 202 and 204 rectify the output of the transformer 200 and the capacitor 208 filters that output. The pass transistor 210 regulates the voltage at the voltage node 34 inasmuch as its base is kept at a fixed voltage by the zener diode 214 which is reverse-biased by the resistor 212.

The resistors 218, 226, 228 and 230 serve to limit the current input to the inputs of the operational amplifiers 78 and 68 to increase their input resistance to lessen their effect on the voltage produced by the voltage dividing resistors 62, 64 and 66 and the temperature sensitive resistors 36 and 38. The potentiometer 216 serves to allow adjustment of the fixed voltage produced by the voltage divider of resistances 62, 64 and 66 at the non-inverting input to the operational amplifier 78. It is, of course, this voltage which is compared to the temperature dependent voltage at the inverting input to the operational amplifier 78 to determine the output state of the operational amplifier. Thus the potentiometer 216 allows adjustment of the voltage which turns the operational amplifier 78 output low, or in other words, allows adjustment of the differential temperature at which the motor 34 is to be turned off, the turn-off set point of the system. The potentiometer 224, which only has effect in the circuit when the diode 82 is forward biased by a low at the output of the operational amplifier 78, serves to adjust the feedback resistance between the output of the operational amplifier 78 and its noninverting input when its output is low. This has the effect of adjusting the voltage which the temperature dependent voltage at the inverting input of the operational amplifier must drop beneath to turn the output of the operational amplifier 78 high again. Or, in other words, the adjustment of the potentiometer 224 adjust the differential temperature at which the operational amplifier 78 will turn the motor 34 back on again, this being the turn-on temperature set point.

As in the circuitry of FIG. 2, the outputs of the operational amplifiers 68 and 78 go low, forward biasing the diodes 74 and 86 to bring the circuit junction 76 down when the motor 34 is to be turned off. When the diodes 74 and 86 are reversed biased, i.e. the outputs of the operational amplifiers 68 and 78 are high, the circuit junction 76 rises in voltage and the timing resistor 236 continually charges the timing capacitor 238. When the voltage at the anode of the PUT 242 exceeds the voltage at the gate of the PUT 242 created by the voltage dividing resistors 244 and 246, the PUT 242 triggers on, discharging the timing capacitor 238 through the PUT 242 and through the primary of the transformer 248. When the timing capacitor 238 is sufficiently discharged, the PUT 242 turns off allowing the timing resistor 236 to start charging the timing capacitor 238 back up again. This constant charging and discharging creates a pulse train through the primary of the transformer 248, which pulse train is passed by the transformer 248 to its secondary to trigger the triac 102. The values of the timing resistor 236 and the timing capacitor 238 are chosen so that the frequency of the pulse train so produced is sufficiently high that the triac 102 is triggered on at the start of each AC wave cycle.

The last alternative embodiment of the circuitry of the present invention is shown in FIG. 5, together with a small addition to FIG. 1. Again components that are similar to those in the embodiment of FIGS. 1 and 2 have been given the same numbers.

In this embodiment, an additional terminal 302 is provided on the housing 10 of FIG. 1. This terminal 302 is joined by a conductor (the broken line in FIG. 1) to a second temperature responsive resistance 38 located in the solar panel 26. Thus for the purposes of this embodiment the reference number 38 should be understood to refer to a pair of temperature sensitive resistances, one connected between the terminals 14 and 16 and one connected between the terminals 16 and 302 with both being responsive to the temperature of the water in the solar collector 26.

In the circuitry of FIG. 5, again contained within the housing 10, all the components of FIG. 2 have been retained. An additional diode 304 is wired between the circuit junction 76 and the cathode of the zener diode 90, with the cathode of the diode 304 facing the zener diode 90. A diode 306 is wired with its cathode also connected to the cathode of the zener diode 90 and with its anode wired through a resistor 308 to the output of an operational amplifier 310. A pair of voltage dividing resistances 312 and 314 are connected between the voltage node 54 and the ground 50 with their junction joined to the inverting input of the operational amplifier 310. An additional series circuit connected between the voltage node 54 and the ground 50 is formed by a reference resistor 316, a reference resistor 318 and the second temperature responsive resistor 38. The junction of the reference resistors 316 and 318 is connected to the noninverting input of the operational amplifier 310 which is also connected by a feedback resistor 320 to its output. A feedback potentiometer 322 is connected between the diode 82 and the resistor 80.

In the operation of the circuitry of FIGS. 1 and 5, the operational amplifiers 68 and 78 function as before to control the motor 34. When the outputs of the operational amplifiers 68 and 78 are high, the resistor 304 forward biases the diode 304 to reverse bias the zener diode 90 to keep the motor 34 on. Now, however, even if one of the operational amplifiers 68 and 78 has its output low, pulling the circuit junction 76 low and reverse biasing the diode 304, the zener diode 90 could be reverse-biased to turn the motor 34 on if the anode of the diode 306 were high. Thus the operational amplifier 310 can turn on the motor 34 regardless of the output states of the operational amplifiers 68 and 78.

The operational amplifier 310 together with the second temperature responsive resistance 38 and the other new components in FIG. 5 function to detect abnormally low temperatures in the solar collector 26. The operational amplifier 310 will turn on the motor 34 to operate the pump 32 when the water in the solar collector 26 nears freezing thereby both circulating the water to keep it from freezing and spreading any heat from the water in the storage tank 24 to the solar collector 26. Thus the operational amplifier 310 has its output normally low with the values of the voltage dividing resistors 312 and 314 being chosen to provide a fixed voltage at the inverting input to the operational amplifier 310 that is normally higher than the voltage at the non-inverting input. The values of the voltage dividing resistor 312 and 314 together with those of the reference resistors 316 and 318 are therefore carefully chosen so that as the resistance of the second temperature responsive resistance 38 approach a value indicating a near freezing temperature, the voltage at the non-inverting input to the operational amplifier will drop below that at the inverting input and the output will be driven high to turn the motor 34 on. The feedback resistor 320 is provided to function as a hysteresis loop to raise the voltage at the non-inverting input to the operational amplifier 310 slightly when its output goes high to prevent twiddling at the turn-on temperature. The potentiometer 322 is similar in function to the potentiometer 244 of FIG. 4.

Inasmuch as many modifications, variations, and changes in detail are possible with the present invention, it is intended that all material in the foregoing description and accompanying drawings be interpreted in an illustrative, and not in a limiting sense.

What is claimed is:

1. In a solar heating system, a controller for energizing a pump motor to circulate fluid between a solar collector and a storage tank, the controller comprising:
   first temperature responsive means for sensing the temperature in the collector;
   second temperature responsive means connected in series with said first temperature responsive means for sensing the temperature in the storage tank;
   switching means for energizing the pump motor;
   first comparator means including an operational amplifier having one input connected between the first and second temperature responsive means and also including voltage dividing means connected to another input of the operational amplifier to create a fixed voltage thereat; and second comparator means for responding to the total temperature sensed by both the first and second temperature responsive means to inhibit the switching means to prevent energization of the motor.

2. A controller as claimed in claim 1 wherein the first and second temperature responsive resistances are connected in series with a reference resistor, said one input of said operational amplifier also being connected to the junction of one of the temperature responsive resistances and the reference resistor.

3. A controller as claimed in claim 2 wherein voltage dividing means is connected to another input of the operational amplifier to supply a fixed voltage thereto.

4. A controller as claimed in claim 1 wherein the one input to the operational amplifier is an inverting input and the another input to the operational amplifier is a non-inverting input, and wherein a feedback loop connects the output of the operational amplifier with the noninverting input.

5. A controller as claimed in claim 4 wherein the feedback loop includes a series circuit of a resistor and a diode.

6. A controller as claimed in claim 1 wherein there is an OR-circuit connecting the first and second comparator means to the switching means so that either of the comparator means can cause the switching means to de-energize the motor.

7. A controller as claimed in claim 6 wherein both of the comparator means are operational amplifiers and wherein the OR-circuit includes a respective diode connecting the output of each operational amplifier to the switching means.

8. A controller as claimed in claim 7 wherein the switching means includes a zener diode biased into reverse breakdown by a resistor and wherein the diodes connected to the operational amplifiers are connected to the junction of the resistor and the zener diode to prevent reverse breakdown of the zener diode when the motor is to be de-energized.

9. A controller as claimed in claim 8 wherein the switching means includes a switching transistor which has the zener diode connected to supply base current thereto.

10. In a solar heating system, a controller for energizing a pump motor to circulate fluid between a solar collector and a storage tank, the controller comprising:

first and second temperature responsive resistances for sensing the temperature in the collector;

a third temperature responsive resistance for sensing the temperature in the storage tank;

first comparator means responsive to the difference in the resistance of the first and third temperature responsive resistances for causing the switching means to energize the motor;

second comparator means responsive to the resistance of the second temperature responsive resistance for operating the switching means to energize the motor; and a third comparator means responsive to the total resistance of the first and third temperature responsive resistances to prevent the first comparator means from allowing the switching means to energize the motor when the total resistance exceeds a limit, said first and third comparator means having outputs joined at an OR-circuit junction to connect to the switching means and wherein the second comparator means is connected so as to be capable of causing the switching means to energize the motor regardless of the outputs of the first and third comparator means.

11. A controller as claimed in claim 10 wherein the temperature sensitive resistances are negative temperature coefficient resistances and the second comparator means is responsive to a pre-selectable low resistance limit of the second temperature responsive resistance to energize the motor.

* * * * *